United States Patent

[11] 3,596,518

| [72] | Inventor | John W. Kirkpatrick<br>Indianapolis, Ind. |
|---|---|---|
| [21] | Appl. No. | 737,457 |
| [22] | Filed | June 17, 1968 |
| [45] | Patented | Aug. 3, 1971 |
| [73] | Assignee | General Motors Corporation<br>Detroit, Mich. |

[54] GAS TEMPERATURE MEASUREMENT
10 Claims, 5 Drawing Figs.

[52] U.S. Cl. .................................................. 73/341,
73/349, 73/DIG. 7
[51] Int. Cl. ...................................................... G01k 7/02,
G01k 13/02
[50] Field of Search ............................................ 73/340
H.F., 3 H, 349, 359, 357

[56] References Cited
UNITED STATES PATENTS

| 2,681,573 | 6/1954 | Brown | 73/349 X |
| 3,167,956 | 2/1965 | Grey | 73/340 H.F. |
| 3,233,458 | 2/1966 | Vrolyk | 73/340 H.F. |

OTHER REFERENCES

Krause, L. N. et al. Heat-Transfer Devices For Determining The Temperature of FLowing Gases. In Temperature: It's Measurement and Control In Science and Industry, Vol. 3, part 2. Reinhold, N.Y. page 590. QC- 271- A6- C2. Copyright 1962.

Primary Examiner—Louis R. Prince
Assistant Examiner—Frederick Shoon
Attorneys—Paul Fitzpatrick and Jean L. Carpenter ABSTRACT: A device for measuring the temperature of very hot gas comprises a tube which has a double wall through which cooling water is circulated. Gas flows through the tube at a predetermined rate past two temperature measuring thermocouples in the duct. By reading the temperature at the two thermocouples, the temperature of the gas entering the tube may be determined.

PATENTED AUG 3 1971
3,596,518
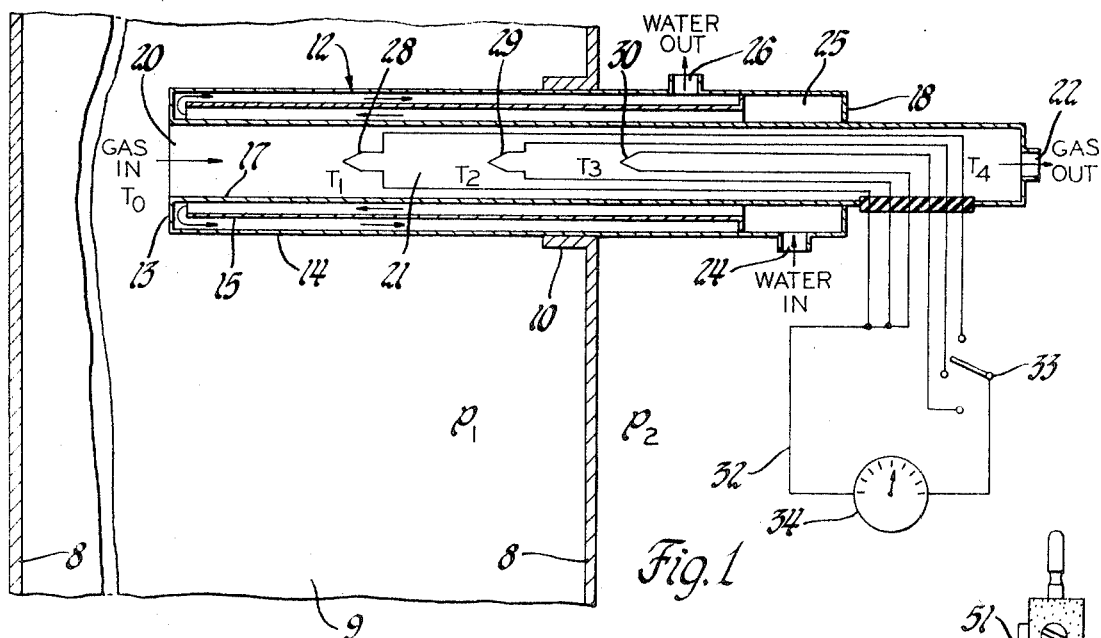
Fig.1
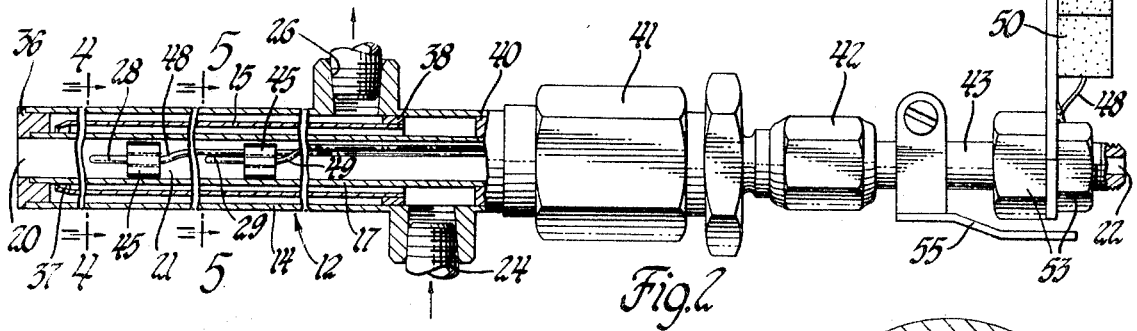
Fig.2
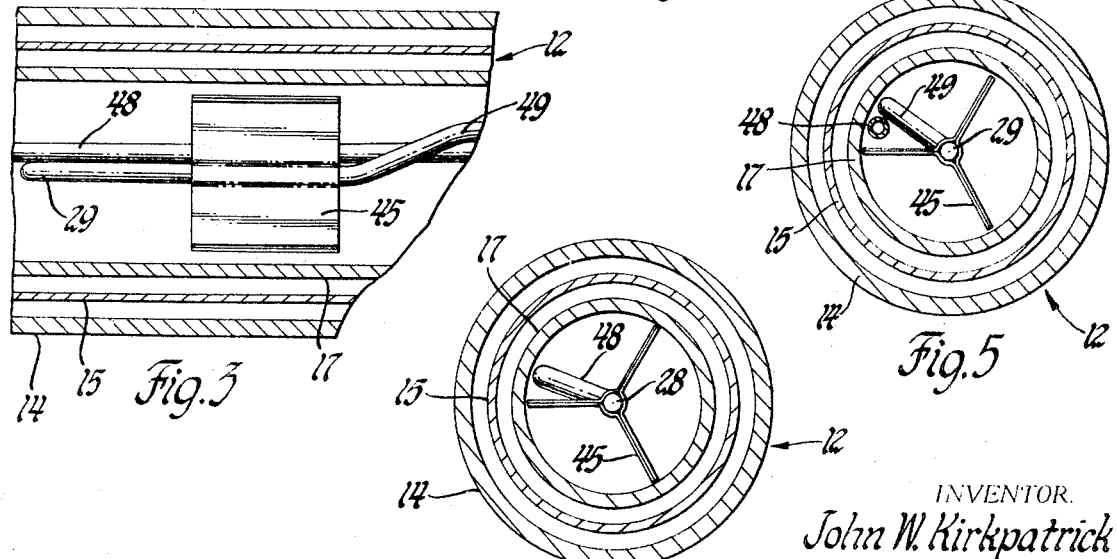
Fig.3
Fig.4
Fig.5
INVENTOR.
John W. Kirkpatrick
BY
Paul Fitzpatrick
ATTORNEY

GAS TEMPERATURE MEASUREMENT

"The invention herein described was made in the course of work under a contract or subcontract thereunder with the Department of Defense."

My invention relates to devices adapted to measure the temperature of very hot gas, particularly to such a device in which the gas is cooled before it comes in contact with temperature measuring devices such as thermocouples. As is well known, as the temperature to which thermocouples must be exposed increases, the endurance of the thermocouples decreases. Also, as the temperature becomes higher, the thermocouples must be made of more expensive refractory materials. The problem of temperature measuring becomes acute in devices such as high temperature gas turbines and various other combustion devices in which high temperatures are generated. Very satisfactory thermocouples may be made, for example, using a couple of Chromel and Alumel, but the temperature range of such devices is below that of many high temperature combustion apparatuses.

According to my invention, a gas at very high temperature is progressively cooled as it flows through a duct past one and then another temperature measuring device. By reading the temperatures at these two devices, the temperature of the entering gas may be determined by extrapolation. My invention is embodied in a very simple, practical, and reliable device which utilizes this principle.

The principal object of my invention is to provide a reliable and economical temperature measuring device for gases at very high temperatures. A further object is to provide an accurate and inexpensive device for measuring temperatures of very hot gases which can be made of materials of moderate resistance to high temperature.

The nature of my invention and the principles thereof will be clear to those skilled in the art from the succeeding detailed description of the preferred embodiment of the invention and the accompanying drawings thereof.

FIG. 1 is a schematic diagram of a temperature measuring device and its installation, illustrating the principles of the invention.

FIG. 2 is a longitudinal view, with parts cut away and in section, of a temperature probe.

FIG. 3 is a greatly enlarged fragmentary view of a portion of FIG. 2.

FIG. 4 is a cross section of the same on the plane indicated by the line 4—4 in FIG. 2.

FIG. 5 is a cross section of the same taken on the plane indicated by the line 5—5 in FIG. 2.

Referring first to FIG. 1, a wall or walls 8 define a duct or chamber 9 containing or conveying a gas the temperature of which is to be measured. The gas within the chamber 9 is at some pressure $P_1$ which for the present we may assume to be substantially higher than ambient pressure outside the duct represented by $P_2$. A collar 10 extending from the wall 8 defines an annular opening within which is mounted a temperature probe or temperature measuring device 12 extending as far as desired into the space 9. This measuring device is a multiple-walled tube 13 defined by an outer tube 14, an intermediate tube 15, and an interior tube 17. A recirculating water jacket surrounding the interior tube 17 is defined by the other two tubes.

The interior tube 17 extends past the end of the outer tube 14 to which it is joined by an annular closure 18. Tube 17 defines a gas inlet 20 within the chamber 9, a gas duct or passage 21 extending from the inlet to the other end of tube 17, and a restricted outlet or nozzle for the gas at 22. The restricted outlet 22 operates as a sonic or choked nozzle to determine the rate of flow of the gas through the temperature measuring device.

A substantial flow of a cooling fluid, preferably water, is admitted to the probe through an inlet 24 into a plenum 25 from which it flows between the intermediate and interior tubes to the gas inlet end of the probe and then flows away from this end between the intermediate and outer tubes to a water outlet 26. The major portion of the interior tube 17 is thus cooled by a circulation of cooling water, this water serving to cool the gas flowing through the passage 21.

In FIG. 1, three thermocouples 28, 29, and 30 are illustrated disposed in the passage 21 at increasing distances from the gas inlet 20. As shown, each thermocouple is connected by one of a pair of insulated leads to common lead 32 and by the other of a pair of insulated leads to a selector switch 33. Lead 32 and switch 33 are connected to a suitable potential measuring device 34 which may be a device of the potentiometer type. By operation of switch 33 the temperature at any one of the three thermocouples may be indicated by potentiometer 34.

The temperature of the gas within chamber 9 which is to be measured is indicated by the symbol $T_0$ and the temperatures at the successive thermocouples by $T_1$, $T_2$ and $T_3$. The temperature of the gas at the outlet end of the probe is indicated as $T_4$.

It is self-evident, in view of the provisions for cooling, that temperatures will progressively decrease from $T_0$ to $T_1$, $T_2$, $T_3$ and $T_4$. It is also self-evident that the values of the temperatures within the probe will be a function of $T_0$, the nature of the gas, the rate of flow through the probe, and the effectiveness of the cooling. By making readings at various locations in the probe on gas at known values of $T_0$, such a probe can be calibrated so that from readings of $T_1$ and $T_2$ or $T_2$ and $T_3$, for example, the value $T_0$ may be determined.

As a practical matter, I have found by experiment with the type of device illustrated in which gas flow is determined by flow through an orifice at sonic velocity; that is, with the ratio of $P_1$ to $P_2$ greater than the critical ratio for the particular gas, the calibration or, in other words, the extrapolation from the values of temperature measured within the probe to determine $T_0$ is not sensitive to variations in $P_1$. The measuring device works to a very good order of accuracy according to the equation $T_0 = C_1 \times (T_1 T_2) + aC_2$. The value of $C_1$ depends primarily upon the dimensions of the probe and location of the thermocouples and the size of the gas outlet, determining gas flow. The value $C_2$ depends primarily upon the temperature of the cooling water.

It will be apparent, of course, that there can be various secondary effects such as the amount of rise in temperature of the cooling water in passing through the tubes which will affect the accuracy or call for additional measurements of such other factors for accurate calibration; but, as a practical matter I prefer to use a substantial flow of water so that the temperature of the water leaving the probe is very little above that of the water entering. In this case, so long as the water entering is kept at a known temperature, the calibration involving the two constants $C_1$ and $C_2$ mentioned above for a particular gas will be valid.

Of course, other means than a choked orifice for controlling flow through the probe could be used, but the use of the choked orifice has its advantages in that it eliminates any corrections for pressure $P_1$ in the calibration of the probe. Incidentally, if $P_1$ is not sufficiently greater than ambient pressure $P_2$ to achieve sonic flow, the outlet may be connected to an aspirator to provide a critical pressure ratio through the orifice 22. Thus, as a practical matter, while three thermocouples may be desirable to investigate the characteristics of a device of the character described, two thermocouples or other temperature measuring devices are sufficient for a reading of $T_0$ and for calibrating the probe. The locations of thermocouples 28 and 29 should be suited to the particular requirements. Clearly, the temperature readings at these points should be reasonably high and reasonably well spaced for good accuracy. Also, there must be sufficient cooling between the inlet and thermocouple 28 so that the temperature at this point is not so high as to prejudice the useful life of the thermocouple. In a typical case, the temperature at $T_1$ may be at 2,000° F. or less and that at thermocouple 29 about 1,000°. The gas is preferably further cooled after passing the second thermocouple so that $T_4$ is a low temperature, preferably in the neighborhood of 300°, so that there is no problem of very hot gas exhausting from the probe.

The foregoing should make clear the principles of the invention. Now referring to FIGS. 2 through 5, the physical structure of an operative embodiment of my temperature measuring device is illustrated. Parts corresponding to those identified in FIG. 1 have corresponding numerals. It will be noted that an annular plug 36 which may be brazed to the tubes 14 and 17 closes the space between them and defines the gas inlet 20. The intermediate tube 15, which divides the two streams of water, is kept concentric with the other tubes by circumferentially distributed spacers 37 and terminates just short of the plug 36. The water inlets and outlets are defined by bosses 24 and 26 which may be brazed to the outer tube 14. A ring 38 closes one end of the passage between the outer and intermediate tubes and a ring 40 closes the gap between the outer and interior tubes. Thus water can flow from the inlet 24 into the annular passage between tubes 15 and 17, flow out the end of tube 15, and back through the annular space between tubes 14 and 15 to the outlet 26. The outer end of the probe outer wall or tube 14 is fixed to a pipe fitting 41 which serves as a reducer and connects to a gland 42 from which extends a section of tube 43 terminating in the outlet nozzle 22. The pipe fittings 41 and 42 may be disassembled to provide access to the interior of tube 17 to install or replace thermocouples.

The thermocouples 28 and 29 are of a miniature type in the preferred embodiment of the invention, this being apparent from the fact that the overall diameter of tube 14 is about five-eighths inch. They may be of any suitable composition such as Chromel-Alumel. Each thermocouple junction 28 and 29 is supported in the center of the interior tube 17 by a sheet metal spider 45 formed of three sheets of metal spotwelded or brazed together, the structure of which will be clearly apparent from the drawings. A two-conductor lead 48 connects thermocouple 28 to the external potentiometer and the lead 49 connects thermocouple 29 to the potentiometer. These leads extend through the interior of tube 17 and are brought out through a hole in the pipe 43 which is suitably sealed. These leads are brought to standard two-contact plug connectors 50 only one of which is visible in FIG. 2, the other being disposed behind it. Connectors 50 are mounted on a plate 51 which is held on the pipe 43 by nuts 53. A bracket 55 which is suitable for handling or locating the probe is clamped to the exterior of pipe 43. Clearly, the details of the plumbing and arrangement of the external contacts are matters of minor importance which may be arranged in any way suitable to the desired use of the probe.

It will be seen that my invention can be embodied in a relatively simple and very compact probe which may be readily connected to a suitable temperature measuring potentiometer or other readout device and that the amount of cooling of the gas may be easily adjusted so that the thermocouples 28 and 29 work at a satisfactory temperature for endurance. According to the formula described above, the gas temperature $T_0$ may be easily determined by extrapolation from $T_1$ and $T_2$ once the device has been calibrated. The arrangement for circulation of cooling water may be easily made. The temperature and quantity of flow are not critical but it is desirable for consistent results for water temperature to be essentially constant and it is also desirable for easy calibration to have a sufficient flow to minimize rise of temperature of the cooling water within the probe.

The detailed description of the preferred embodiment of my invention for the purpose of explaining the principles thereof is not to be considered as limiting or restricting the invention, since many modifications may be made by the exercise of skill in the art without departing from the scope of the invention.

I claim:

1. A gas-temperature measuring device comprising, in combination, a tube defining an inlet for gas, an outlet for gas, and a passage connecting the inlet to the outlet, a first temperature-sensing device in the passage downstream from the inlet, a second temperature-sensing device in the passage downstream from the first temperature-sensing device, gas colling means including a first gas cooling area associated with the passage between the inlet and the first temperature-sensing device, and a second gas cooling area associated with the passage between the two temperature-sensing devices, said cooling means maintaining a constant ratio of gas-cooling effect between the two cooling areas.

2. A device as recited in claim 1 in which the two gas cooling areas are defined by a jacket on the tube for circulation of a cooling medium.

3. A device as recited in claim 1 including means for circulating a cooling medium from a common source through both cooling areas.

4. A device as recited in claim 1 including means controlling the rate of gas flow through the passage.

5. A device as recited in claim 4 in which the gas flow controlling means is a choked orifice.

6. A device as recited in claim 1 including further gas cooling areas between the second temperature-sensing device and the outlet.

7. A device for measuring the temperature of a gas comprising, in combination, a tubular probe defining a gas inlet and a passage for gas, a nozzle operating above the critical pressure ratio for discharging the gas from the passage, a first temperature-sensing device in the passage downstream from the inlet and a second temperature-sensing device in the passage downstream from the first, and means for circulating a coolant at substantially constant temperature about the outer surface of the probe throughout a zone extending from a point upstream of the first temperature-sensing device at least to the location of the second temperature-sensing device.

8. A device as recited in claim 7 including first and second jackets surrounding the tube, means for guiding the coolant through the first jacket in the direction toward the gas inlet in contact with the tube, and means for returning the coolant through the space defined between the two jackets.

9. A device as recited in claim 7 in which the temperature-sensing devices are thermocouples.

10. A device for measuring the temperature of a gas confined within a wall, comprising, in combination, a hollow tubular probe extending through the wall from a point without the wall to a point within the wall, the probe having a gas inlet within the wall and a gas outlet without the wall connected through the interior of the hollow probe, means determining an ascertainable rate of gas flow through the probe from the inlet to the outlet, heat exchange means in the probe effective to cool the gas progressively as it flows from the inlet to the outlet, and at least two temperature-sensing devices located at points mutually spaced along the path of gas flow through the probe.

PO-1050
(5/69)

UNITED STATES PATENT OFFICE
CERTIFICATE OF CORRECTION

Patent No. 3,596,518     Dated August 3, 1971

Inventor(s) John W. Kirkpatrick

It is certified that error appears in the above-identified patent and that said Letters Patent are hereby corrected as shown below:

Column 2, line 36, correct the equation to read

-- $T_0 = C_1 \times (T_1 - T_2) + C_2$ --.

Column 4, line 14, delete "colling" and insert

-- cooling --.

Signed and sealed this 4th day of January 1972.

(SEAL)
Attest:

EDWARD M. FLETCHER, JR.        ROBERT GOTTSCHALK
Attesting Officer              Acting Commissioner of Patents